United States Patent
Massand

(10) Patent No.: US 8,527,864 B2
(45) Date of Patent: Sep. 3, 2013

(54) METHOD OF COMPOUND DOCUMENT COMPARISON

(75) Inventor: Deepak Massand, McLeansville, NC (US)

(73) Assignee: Litera Technologies, LLC, McLeansville, NC (US)

( * ) Notice: Subject to any disclaimer, the term of this patent is extended or adjusted under 35 U.S.C. 154(b) by 58 days.

(21) Appl. No.: 12/861,000

(22) Filed: Aug. 23, 2010

(65) Prior Publication Data

US 2010/0318530 A1    Dec. 16, 2010

Related U.S. Application Data

(63) Continuation of application No. 11/444,140, filed on May 30, 2006, now Pat. No. 7,818,660.

(60) Provisional application No. 60/763,300, filed on Jan. 29, 2006.

(51) Int. Cl.
*G06F 17/00*    (2006.01)

(52) U.S. Cl.
USPC ............................................... 715/209

(58) Field of Classification Search
USPC ................................................... 715/209
See application file for complete search history.

(56) References Cited

U.S. PATENT DOCUMENTS

| | | |
|---|---|---|
| 3,920,895 A | 11/1975 | Vieri et al. |
| 3,920,896 A | 11/1975 | Bishop et al. |
| 5,008,853 A | 4/1991 | Bly et al. |
| 5,129,082 A | 7/1992 | Tirfing et al. |
| 5,146,552 A | 9/1992 | Cassorla et al. |
| 5,204,947 A | 4/1993 | Bernstein et al. |
| 5,321,505 A | 6/1994 | Leddy |
| 5,341,469 A | 8/1994 | Rossberg et al. |
| 5,515,491 A | 5/1996 | Bates et al. |
| 5,539,871 A | 7/1996 | Gibson |
| 5,596,700 A | 1/1997 | Darnell et al. |
| 5,596,705 A | 1/1997 | Reimer et al. |
| 5,606,609 A | 2/1997 | Houser et al. |
| 5,659,676 A | 8/1997 | Redpath |
| 5,664,208 A | 9/1997 | Pavley et al. |
| 5,669,005 A | 9/1997 | Curbow et al. |
| 5,671,428 A | 9/1997 | Muranaga et al. |
| 5,694,544 A | 12/1997 | Tanigawa et al. |
| 5,706,452 A | 1/1998 | Ivanov |

(Continued)

OTHER PUBLICATIONS

Final Office Action dated Jun. 12, 2012, in U.S. Appl. No. 12/350,144.

(Continued)

*Primary Examiner* — Doug Hutton, Jr.
*Assistant Examiner* — Andrew McIntosh
(74) *Attorney, Agent, or Firm* — Finnegan, Henderson, Farabow, Garrett & Dunner L.L.P.

(57) ABSTRACT

A method and system for comparing compound documents. An original compound document and a modified compound document are analyzed to determine and mark the location of embedded objects. A comparison is performed between an original primary document and the modified primary document, ignoring the embedded objects, the output of which is a comparison output document. The embedded objects are compared by copying the contents of the embedded objects to compatible documents, comparing the embedded object from the original compound document and the embedded object from the modified compound document, the output of which is inserted into the comparison output document using the location markers of the embedded objects.

31 Claims, 6 Drawing Sheets

(56) References Cited

U.S. PATENT DOCUMENTS

| | | | |
|---|---|---|---|
| 5,706,502 A | 1/1998 | Foley et al. | |
| 5,708,826 A | 1/1998 | Ikeda et al. | |
| 5,708,845 A | 1/1998 | Wistendahl et al. | |
| 5,740,444 A | 4/1998 | Frid-Nielsen | |
| 5,752,055 A | 5/1998 | Redpath et al. | |
| 5,758,313 A | 5/1998 | Shah et al. | |
| 5,761,419 A | 6/1998 | Schwartz et al. | |
| 5,761,499 A | 6/1998 | Sonderegger | |
| 5,781,732 A | 7/1998 | Adams | |
| 5,781,901 A | 7/1998 | Kuzma | |
| 5,787,175 A | 7/1998 | Carter | |
| 5,799,191 A | 8/1998 | Moriyasu et al. | |
| 5,801,702 A | 9/1998 | Dolan et al. | |
| 5,806,078 A | 9/1998 | Hug et al. | |
| 5,809,512 A | 9/1998 | Kato | |
| 5,860,073 A | 1/1999 | Ferrel et al. | |
| 5,864,870 A | 1/1999 | Guck | |
| 5,870,754 A | 2/1999 | Dimitrova et al. | |
| 5,878,421 A | 3/1999 | Ferrel et al. | |
| 5,890,177 A | 3/1999 | Moody et al. | |
| 5,893,126 A | 4/1999 | Drews et al. | |
| 5,911,776 A | 6/1999 | Guck | |
| 5,931,906 A | 8/1999 | Fidelibus, Jr. et al. | |
| 5,937,066 A | 8/1999 | Gennaro et al. | |
| 5,938,724 A | 8/1999 | Pommier et al. | |
| 5,941,944 A | 8/1999 | Messerly | |
| 5,944,785 A | 8/1999 | Pommier et al. | |
| 5,949,413 A | 9/1999 | Lerissa et al. | |
| 5,950,214 A | 9/1999 | Rivette et al. | |
| 5,956,736 A | 9/1999 | Hanson et al. | |
| 5,958,006 A | 9/1999 | Eggleston et al. | |
| 5,978,836 A | 11/1999 | Ouchi | |
| 5,987,469 A | 11/1999 | Lewis et al. | |
| 6,009,462 A | 12/1999 | Birrell et al. | |
| 6,014,135 A | 1/2000 | Fernandes | |
| 6,029,171 A | 2/2000 | Smiga et al. | |
| 6,061,696 A * | 5/2000 | Lee et al. | 715/209 |
| 6,064,751 A | 5/2000 | Smithies et al. | |
| 6,067,551 A | 5/2000 | Brown et al. | |
| 6,088,709 A | 7/2000 | Watanabe | |
| 6,119,147 A | 9/2000 | Toomey et al. | |
| 6,158,903 A | 12/2000 | Schaeffer et al. | |
| 6,178,431 B1 | 1/2001 | Douglas | |
| 6,182,080 B1 | 1/2001 | Clements | |
| 6,212,534 B1 | 4/2001 | Lo et al. | |
| 6,243,722 B1 | 6/2001 | Day et al. | |
| 6,289,460 B1 | 9/2001 | Hajmiragha | |
| 6,317,777 B1 | 11/2001 | Skarbo et al. | |
| 6,324,555 B1 | 11/2001 | Sites | |
| 6,334,141 B1 | 12/2001 | Varma et al. | |
| 6,336,134 B1 | 1/2002 | Varma | |
| 6,343,313 B1 | 1/2002 | Salesky et al. | |
| 6,360,236 B1 | 3/2002 | Khan et al. | |
| 6,363,352 B1 | 3/2002 | Dailey et al. | |
| 6,411,989 B1 | 6/2002 | Anupam et al. | |
| 6,507,858 B1 * | 1/2003 | Kanerva et al. | 715/234 |
| 6,560,620 B1 * | 5/2003 | Ching | 715/229 |
| 6,560,637 B1 | 5/2003 | Dunlap et al. | |
| 6,590,584 B1 | 7/2003 | Yamaura et al. | |
| 6,643,663 B1 | 11/2003 | Dabney et al. | |
| 6,681,371 B1 | 1/2004 | Devanbu | |
| 6,687,878 B1 | 2/2004 | Eintracht et al. | |
| 6,708,172 B1 | 3/2004 | Wong et al. | |
| 7,251,680 B2 | 7/2007 | DeVos | |
| 7,650,355 B1 | 1/2010 | Davis | |
| 7,987,444 B2 | 7/2011 | Fuller et al. | |
| 2001/0037367 A1 | 11/2001 | Iyer | |
| 2002/0049786 A1 | 4/2002 | Bibliowicz et al. | |
| 2002/0059342 A1 | 5/2002 | Gupta et al. | |
| 2002/0059343 A1 | 5/2002 | Kurishima et al. | |
| 2002/0065848 A1 | 5/2002 | Walker et al. | |
| 2002/0078088 A1 | 6/2002 | Kuruoglu et al. | |
| 2002/0085030 A1 | 7/2002 | Ghani | |
| 2002/0107886 A1 | 8/2002 | Gentner et al. | |
| 2002/0143691 A1 | 10/2002 | Ramaley et al. | |
| 2003/0023961 A1 | 1/2003 | Barsness et al. | |
| 2003/0112273 A1 | 6/2003 | Hadfield et al. | |
| 2003/0158855 A1 | 8/2003 | Farnham et al. | |
| 2003/0197730 A1 | 10/2003 | Kakuta et al. | |
| 2003/0217336 A1 | 11/2003 | Gounares et al. | |
| 2004/0085354 A1 | 5/2004 | Massand | |
| 2004/0205653 A1 | 10/2004 | Hadfield et al. | |
| 2004/0230616 A1 | 11/2004 | Kruy et al. | |
| 2005/0108280 A1 | 5/2005 | Kagle et al. | |
| 2005/0240858 A1 * | 10/2005 | Croft et al. | 715/500 |
| 2006/0167879 A1 | 7/2006 | Umeki et al. | |
| 2006/0253482 A1 | 11/2006 | Zellweger et al. | |
| 2006/0262339 A1 | 11/2006 | Jacobs et al. | |
| 2007/0011211 A1 | 1/2007 | Reeves et al. | |
| 2007/0186157 A1 | 8/2007 | Walker et al. | |
| 2007/0294610 A1 | 12/2007 | Ching | |
| 2008/0104016 A1 | 5/2008 | Atmaja | |
| 2009/0119578 A1 | 5/2009 | Relyea et al. | |
| 2010/0049745 A1 | 2/2010 | Aebig et al. | |

OTHER PUBLICATIONS

Office Action dated May 9, 2012, in U.S. Appl. No. 13/400,848.
Office Action dated Nov. 23, 2011, in U.S. Appl. No. 12/350,144.
Final Office Action dated Aug. 11, 2011, in U.S. Appl. No. 12/350,144.
Office Action dated Mar. 23, 2011, in U.S. Appl. No. 12/350,144.
Final Office Action dated Oct. 24, 2012, in U.S. Appl. No. 13/400,848.

* cited by examiner

METHOD OF COMPOUND DOCUMENT COMPARISON

RELATED APPLICATION DATA

This patent application is a continuation of Application Ser. No. 11/444,140, filed May 30, 2006, which claims priority to U.S provisional patent application No. 60/763,300, filed Jan. 29, 2006, the disclosures of which are hereby incorporated by reference.

BACKGROUND

1. Field of the Invention

The field of the invention relates generally to systems and methods of electronic document comparison.

2. Related Background

FIGS. 1 and 2 illustrate the relationship between documents, objects, users and applications users may use to create, modify, compare and manage electronic documents.

An electronic document, or document, may be viewed as a collection of user-input data used with a certain application (such as, Microsoft Word®, Corel WordPerfect® and Microsoft Excel®). In a general sense, a document is the data or information generated when using a computer application. FIG. 1 is a generalized block diagram illustrating the relationships between a document that may be used with the present invention and an application as such relationships exist in conventional document creation, management and editing programs. A user 101 interacts with an application 102 to create, view, alter, edit or manage a document 103. The application makes use of the document so the user may edit the document, view the document, or perform other actions in relation to the document.

With the advent of OLE (Object Linking and Embedding), a document may contain data from other applications as well as from the main application. The data from other applications are contained in "objects", or "document objects." One example of the use of OLE is when a Word document has a spreadsheet table from Excel embedded within it. In this example the excel spreadsheet is an object within a Word document. Embedded objects may include text, tables, pictures or drawings, or other forms of data. A document with one or more objects from other applications is typically referred to as a "Compound Document". Unless otherwise specified, an "object" refers to a section of the document that is created from, or edited by, an application other than the application that edits or creates the primary document the object is embedded into.

Single format documents, that is documents not including embedded objects from other applications, are often compared using the well-known algorithm called 'LCS' (longest known sequence) or HCS (heaviest common sequence) to determine differences between two documents. There exist specialized adaptations or versions of LCS and HCS specially made to compare Word Documents, Excel Documents, HTML documents and PDF documents. In addition to LCS, other comparison algorithms include: HCS (heaviest common sequence), LCSS (longest common sub sequence) or MSS (matching similarity sequence). These comparison algorithms are implemented in comparison engines, some of which are integrated into document creation and editing applications (such as Word, Excel, Open Office™, StarOffice™, etc.), and some of which are implemented separately from the document creation and editing applications, as discussed below in connection with FIG. 3.

FIG. 2 is a generalized block diagram illustrating the relationship between the objects of an electronic document and the corresponding application used to create, edit or view them. A compound document 201, such as a Word document, may include objects such as an Excel spreadsheet, a picture, a PowerPoint slide or graphic, and a Visio drawing. The compound document 201 is created and edited by an application 202. In this example, the application creating and editing a compound Word document may be Microsoft's Word program. The applications 203 creating and editing the embedded objects are, respectively, Microsoft's Excel, Paint, PowerPoint and Visio.

Conventional document management, creation, editing and viewing applications often include the ability to compare documents and output a document which illustrates the differences between two documents. Typically, the output document including indications of the differences between the two input documents is referred to as a "redline" or "redline document." FIG. 3 is a generalized block diagram illustrating a conventional document comparison application as may be found in the prior art. A document comparison engine 303 may compare an original document 301 (or first document) to a modified document 302 (or second document). The output of the comparison is a "redline" document or comparison output document 304. Typically, the comparison output document provides indications of what has changed between the original document and the modified document. Conventional document comparison engines and applications provide for comparison of single format documents.

Accordingly, a need exists to provide a comparison system and method capable of comparing compound documents.

SUMMARY

The present invention provides for a computer based system and method for comparing compound documents. An original compound document and a modified compound document are analyzed to determine and mark the location of embedded objects. A comparison is performed between an original primary document and the modified primary document, ignoring the embedded objects, the output of which is a comparison output document. The embedded objects are compared by copying the contents of the embedded objects to compatible documents, comparing the embedded object from the original compound document and the embedded object from the modified compound document, the output of the comparison is inserted into the comparison output document using the location markers of the embedded objects.

DETAILED DESCRIPTION

The present invention is described in the context of a specific embodiment. This is done to facilitate the understanding of the features and principles of the present invention and the present invention is not limited to this embodiment. In particular, the present invention is described in the context of a computer system used to compare, edit, view and/or modify electronic documents.

Figure 1:
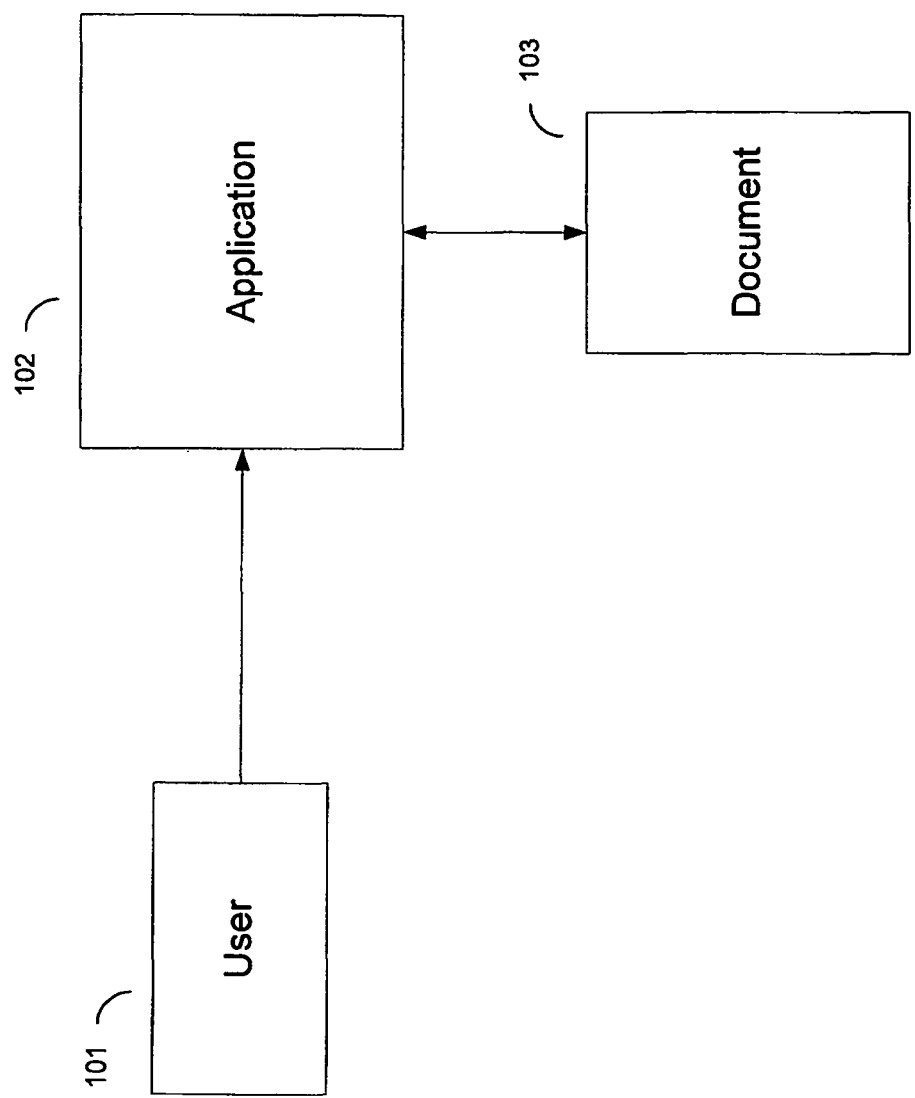
FIG. 1 is a generalized block diagram illustrating the relationships between an electronic document that may be used with the present invention and an application of the prior art that may be used to create or modify such an electronic document.
Figure 2:
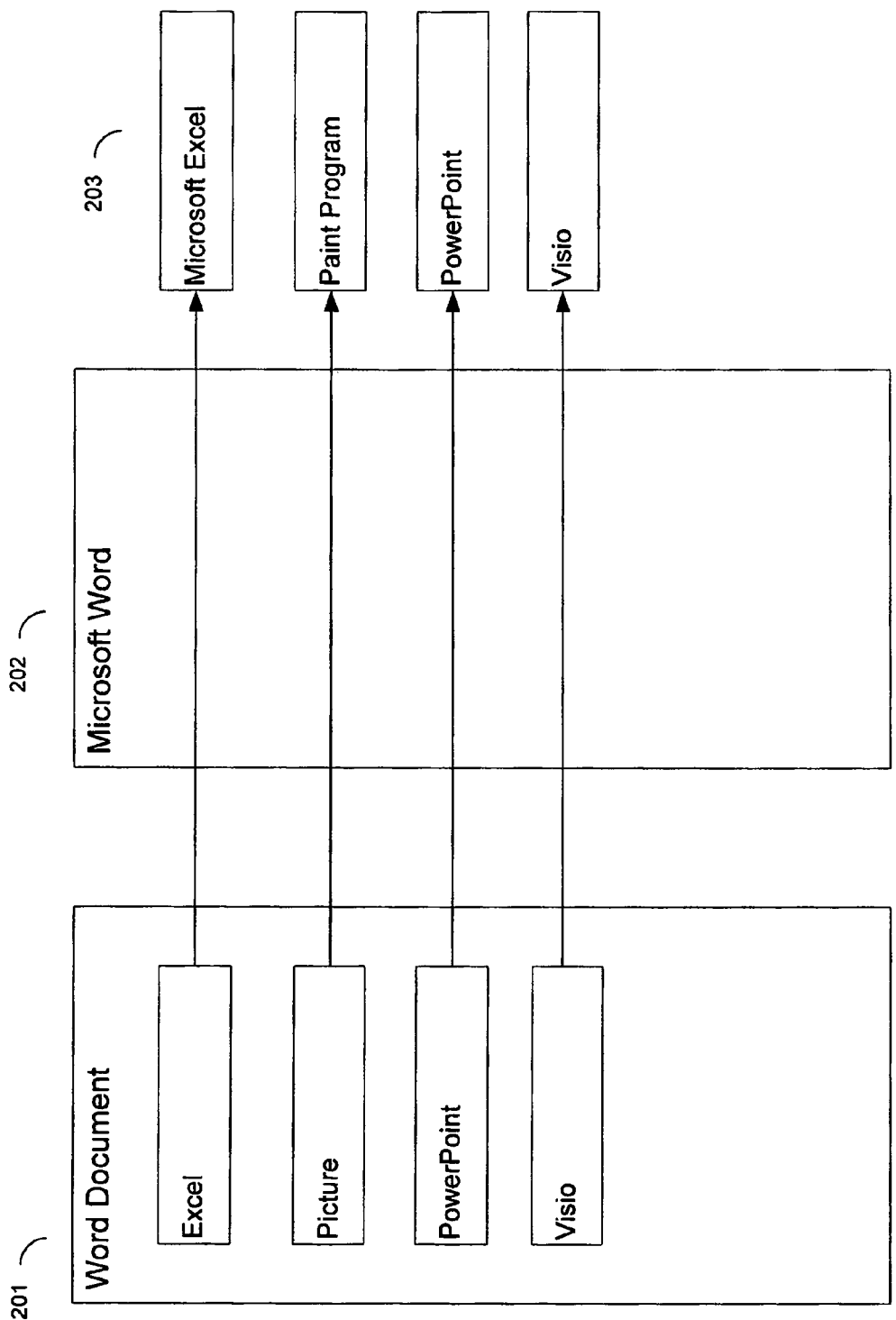
FIG. 2 is a generalized block diagram illustrating the relationship between the objects of a electronic document that may be used with the present invention and a corresponding application of the prior art used to create, edit or view such objects.
Figure 3:
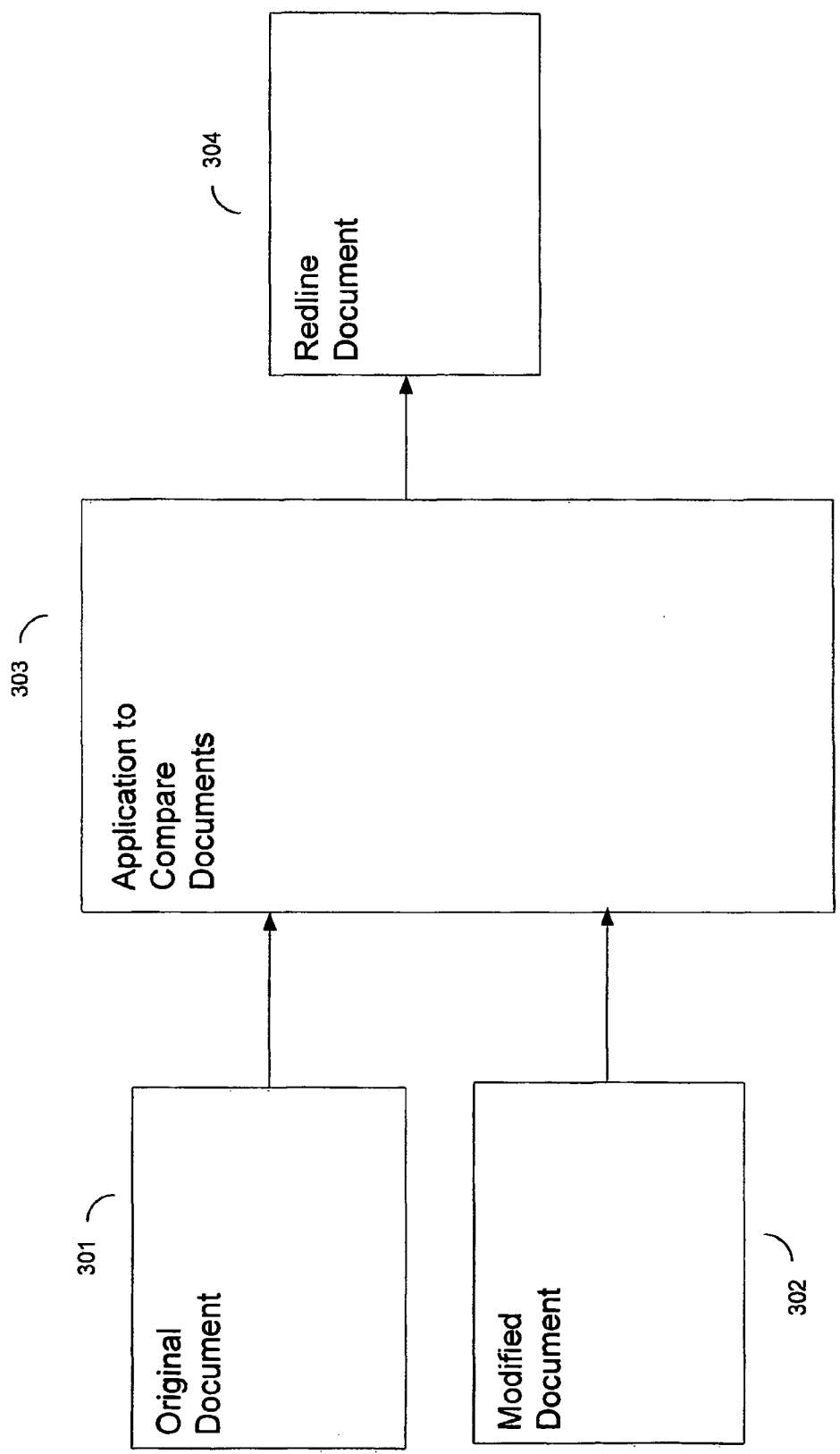
FIG. 3 is a generalized block diagram illustrating a conventional document comparison application as may be found in the prior art.
Figure 4:
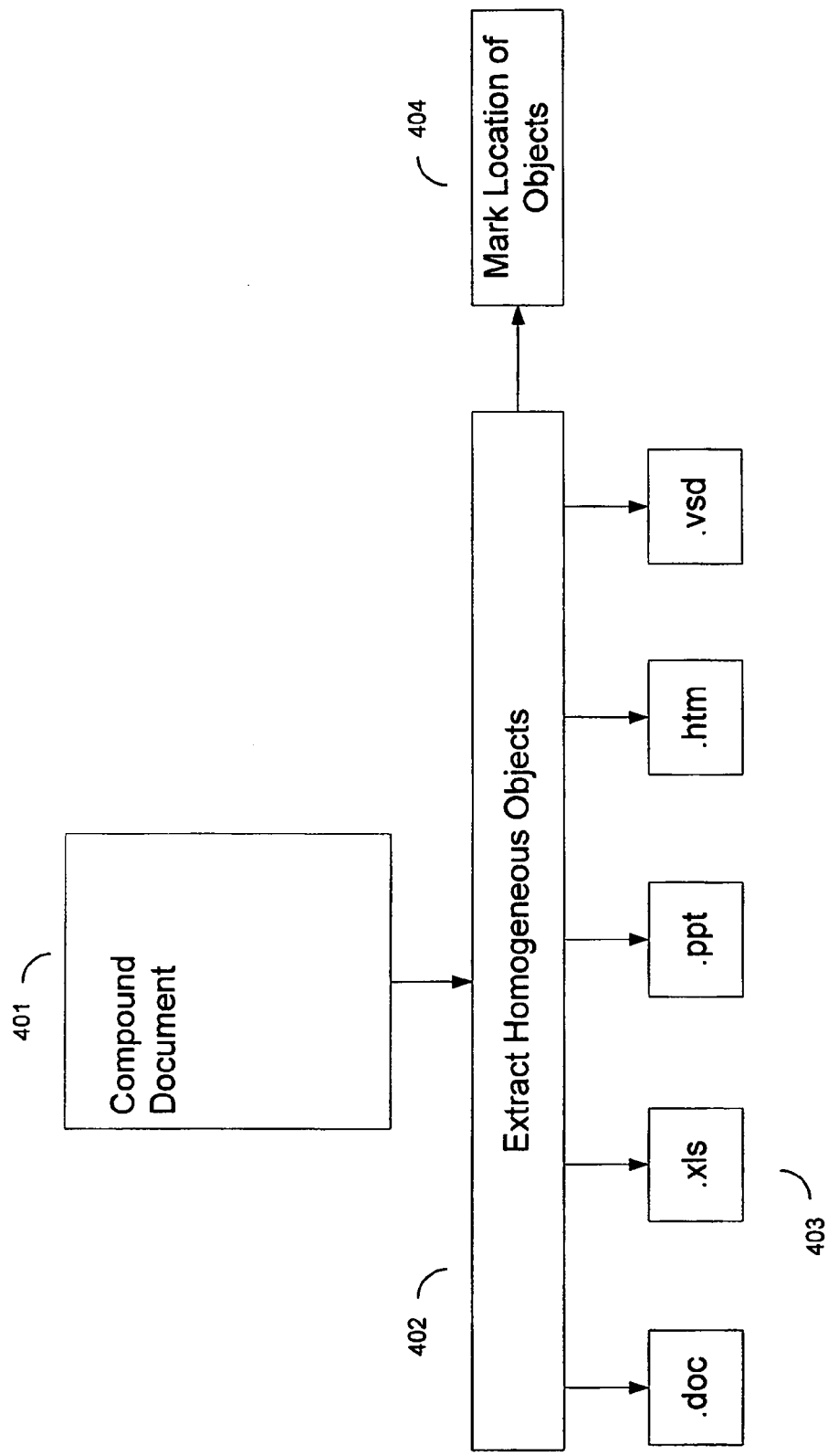
FIG. 4 is a generalized block diagram illustrating the extraction and marking of embedded objects in a document to be compared, according to one possible embodiment.

FIG. 4 is a generalized block diagram illustrating the extraction and marking of embedded objects in a document to be prepared. A compound document 401 has the objects 403 embedded in the document and "extracted" 402. In the presently preferred embodiment, extraction involves copying the object to a corresponding document of the same document type, or document format, as the object being copied. Additionally, the location (or locations) 404 of the objects in the primary document are marked. In the presently preferred embodiment, the location is marked in the primary document file. Alternatively, the position of the objects may be marked outside of the primary document, for example in a database or in another file.

Figure 5:
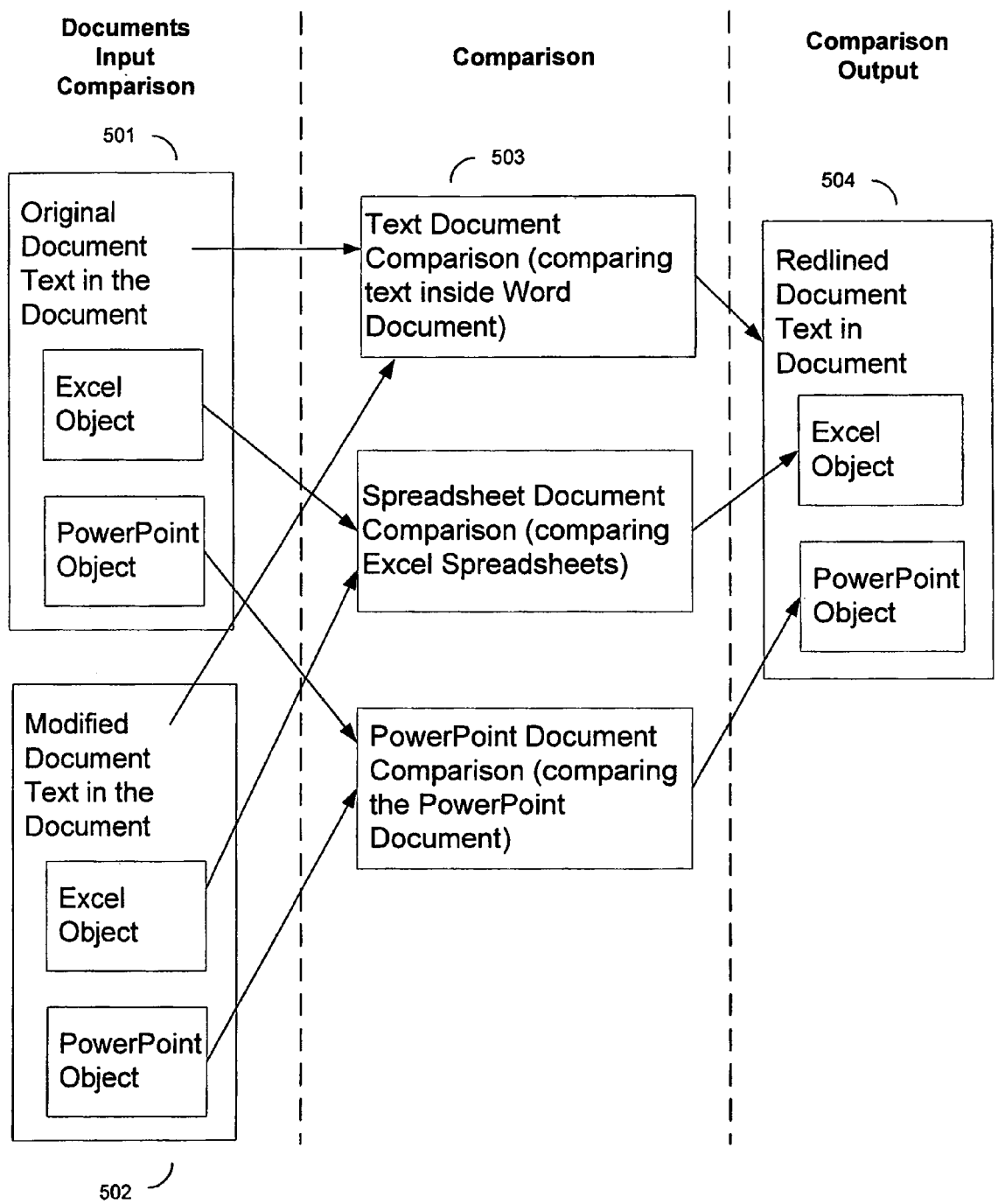
FIG. 5 is a generalized block diagram illustrating the comparison of compound document objects, according to one possible embodiment.

FIG. 5 is a generalized block diagram illustrating the comparison of compound document objects. The input documents to the comparison process, the original document 501 and the modified document 502, contain embedded objects 503 from a different document type than the primary document. In the example embodiment shown there are two embedded objects in the input documents, one Excel object and one PowerPoint object. The primary document type of the input documents are Word documents. The marked location information is used in the comparison process to confine the comparison to the primary document type, thereby excluding the embedded objects from the comparison of the primary document type.

The comparison process compares the text of the primary document type of the input documents, with the results of the comparison output to a primary comparison output document. The comparison of the first embedded object types, the Excel objects, is output to the comparison output document as an Excel object embedded in the primary comparison output document according to the marked location information. The marked location information is used to locate the comparison output of the Excel objects in the comparison output object. Similarly, the comparison of the second embedded object types, the PowerPoint objects, are output to the comparison output document as a PowerPoint object embedded in the comparison output document. The marked location information is used to position the comparison output of the PowerPoint objects in the comparison output document.

While the example input documents only contained two embedded objects, alternate embodiments may contain more or fewer embedded objects. With such input documents, the presently preferred embodiment compares all of the embedded objects of the input documents. However, alternative embodiments may choose to ignore one or more embedded object pairs (an embedded object pair includes an original embedded object from the original input document and the corresponding embedded object from the modified input document), or choose to ignore one ore more embedded object types, from comparison. In yet another alternative embodment, the user may indicate, through a comparison command, or through configuration of a document application implementing an alternative embodiment, that certain objects or certain object types are to be ignored from comparison.

Additionally, input documents may contain multiple embedded objects of the same document type located at different positions within the primary document (for example, a Word document with multiple Excel spreadsheets located at different positions within the Word document). In the presently preferred embodiment, the multiple embedded objects are compared and the results of the comparisons are embedded in objects in the comparison output document, using the marked location information.

Figure 6:
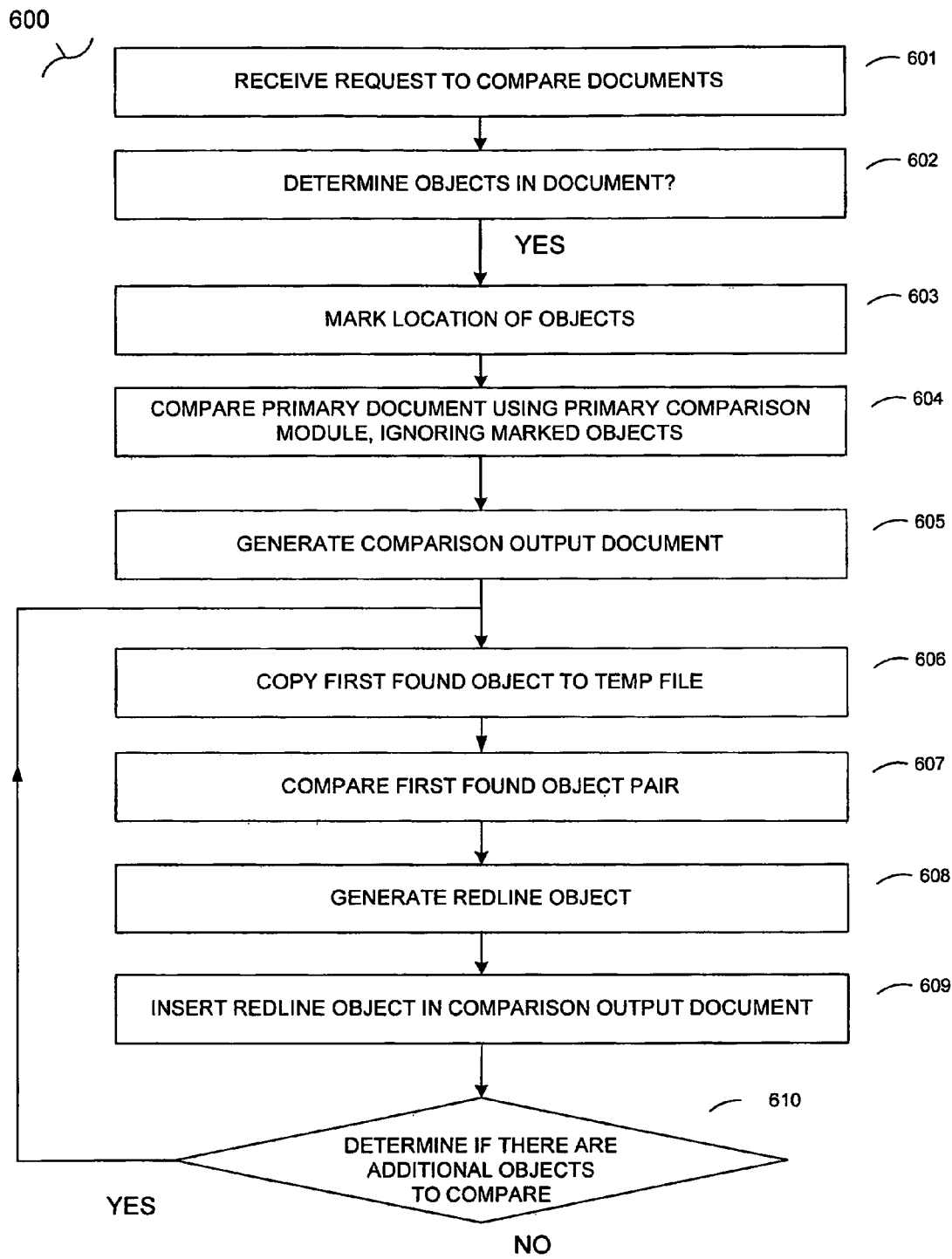
FIG. 6 is a generalized flow diagram illustrating the process of finding the differences in compound documents, according to one possible embodiment.

FIG. 6 is a generalized flow diagram illustrating the process of comparing documents to find the differences in the compound documents by opening the document identified for comparison. At step 601 a request to compare documents is received. The request may be from a user, or from another program or process. At step 602 the input comparison document (or primary input document), the document designated for comparison, is examined for OLE objects. In the presently preferred embodiment, at step 601 both the original input document and the modified input document are examined for OLE objects. If an OLE object is found at step 602, then at step 603 the location of the discovered OLE object is marked. At step 604 the primary comparison documents are compared, ignoring the embedded objects. In the preferred embodiment, the comparison process ignores the embedded objects using the location markings from step 603. At step 605 the results of the comparison of the primary comparison documents is output to a primary comparison output document, or "redline" primary comparison document. Referring to the example of FIG. 5, the output of step 605 is comparison output primary document which is a Word document, or a comparison output Word document.

At step 606 the OLE objects found at step 602, in one embodiment are copied to a document of the type that created the object to create an object comparison document. That is, if the object contains data which is from a given application, the data of the object is copied to a document of the type of the given application (or to a compatible application document type). As an example, if the OLE object were of the type created by PowerPoint, preferably the data of this object is copied to a PowerPoint comparison document. Similar action is taken for OLE objects from other applications. Step 606 is performed for both the object from the original comparison document and from the modified comparison document, thus resulting in an original OLE object comparison document and a modified OLE object comparison document.

At step 607 a comparison engine of the type to compare documents of the given application is initiated to compare the original OLE object comparison document and the modified OLE object comparison document. Thus, referring again to the example of FIG. 5, step 607 initiates the comparison engine to compare Excel object comparison documents created at step 606. Similarly, at step 607 the comparison engine to compare PowerPoint documents is initiated to compare the PowerPoint object comparison documents created at step 606. At step 607 the original OLE object comparison document and modified OLE object comparison document are compared using a comparison engine appropriate for the document type of the object. The results of the comparison performed at step 607 generates a "redline" OLE object document, or comparison output OLE object document, are placed in a comparison output primary document, or "redline" primary document at step 608. Referring again to the example of FIG. 5, the output of step 607 is a comparison output Excel object document and a comparison output PowerPoint document.

Step 609 inserts the comparison output OLE object document (or documents) in the comparison output primary document output from step 605. Referring again to the example of FIG. 5, the comparison output Excel object document and comparison output PowerPoint document are inserted at the comparison output Word document.

The insertion of the comparison output OLE object document uses the OLE object marking information from step 601. By using the location markings the comparison output document is able to provide the user with a document that has a similar organization to the original and modified input documents.

If the comparison input documents included additional embedded objects which have not been compared, at step 610 the comparison process returns to step 606 to compare the next embedded object pair. If there are no additional embedded objects which have not been compared (or there are no embedded objects which have not been designated to exempt from comparison).

While the above embodiments and examples compared only two documents, alternate embodiments could compare three or more documents.

The invention has been described with reference to particular embodiments. However, it will be readily apparent to those skilled in the art that it is possible to embody the invention in specific forms other than those of the preferred embodiments described above. This may be done without departing from the spirit of the invention.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

I claim:

1. A method of comparing documents, performed by a processor, comprising:
   extracting a first OLE object from a first document comprising first data and the first OLE object;
   extracting a second OLE object from a second document comprising second data and the second OLE object;
   comparing the first data with the second data to generate a primary comparison output document and comparing the first extracted OLE object with the second extracted OLE object to generate an object comparison output document; and
   generating a comparison output document by inserting the object comparison output document including a result of the comparing of the first extracted OLE object with the second extracted OLE object into the primary comparison output document including a result of the comparing of the first data with the second data.

2. The method of claim 1, further comprising:
   determining at least one of a first location of the first OLE object and a second location of the second OLE object;
   inserting a result of the comparing of the first extracted OLE object and the second extracted OLE object into the comparison output document based on at least one of the first location and the second location.

3. The method of claim 1, further comprising: providing information based on the comparison output document for displaying differences between at least one of the first extracted OLE object and the second extracted OLE object and between the first data and the second data.

4. The method of claim 3, wherein the comparison output document includes data used to display discrete differences between the first extracted OLE object and the second extracted OLE object in a color format, an underline format, a bold format, or an italics format.

5. The method of claim 1, wherein the comparison output document includes data reflecting a difference between the first extracted OLE object and the second extracted OLE object.

6. The method of claim 1, wherein the first extracted OLE object is of a type compatible with an application that created the first OLE object.

7. A non-transitory computer-readable storage medium storing instructions that, when executed by a processor, perform a process for comparing documents, the process comprising:
   extracting a first OLE object from a first document comprising first data and the first OLE object;
   extracting a second OLE object from a second document comprising second data and the second OLE object;
   comparing the first data with the second data to generate a primary comparison output document and the first extracted OLE object with the second extracted OLE object to generate an object comparison output document; and
   generating a comparison output document by inserting the object comparison output document including a result of the comparing of the first extracted OLE object with the second extracted OLE object into the primary comparison output document including a result of the comparing of the first data with the second data.

8. The computer-readable storage medium of claim 7, further including instructions that, when executed by the processor, perform processes comprising:
   determining at least one of a first location of the first OLE object and a second location of the second OLE object;
   inserting a result of the comparing of the first extracted OLE object and the second extracted OLE object into the comparison output document based on at least one of the first location and the second location.

9. The computer-readable storage medium of claim 7, further including instructions that, when executed by the processor, perform processes comprising: providing information based on the comparison output document for displaying differences between at least one of the first extracted OLE object and the second extracted OLE object and between the first data and the second data.

10. The computer-readable storage medium of claim 9, wherein the comparison output document includes data used to display discrete differences in a color format, an underline format, a bold format, or an italics format.

11. The computer-readable storage medium of claim 7, wherein the comparison output document includes data reflecting a difference between the first extracted OLE object and the second extracted OLE object.

12. The computer-readable storage medium of claim 7, wherein the first extracted OLE object is of a type compatible with an application that created the first OLE object.

13. A system for comparing documents comprising:
   a processor; and
   a memory including instructions that, when executed by the processor, cause the processor to perform the operations of:
      extracting a first OLE object from a first document comprising first data and the first OLE object;
      extracting a second OLE object from a second document comprising second data and the second OLE object;

comparing the first data with the second data and the first extracted OLE object with the second extracted OLE object, and comparing the first data with the second data to generate a primary comparison output document and the first extracted OLE object with the second extracted OLE object to generate an object comparison output document; and generating a comparison output document by inserting the object comparison output document including a result of the comparing of the first extracted OLE object with the second extracted OLE object into the primary comparison output document including a result of the comparing of the first data with the second data.

14. The system of claim 13, wherein the processor further performs the operations of:

determining at least one of a first location of the first OLE object and a second location of the second OLE object;

inserting a result of the comparing of the first extracted OLE object and the second extracted OLE object into the comparison output document based on at least one of the first location and the second location.

15. The system of claim 13, wherein the processor further performs the operation of: providing information based on the comparison output document for displaying differences between at least one of the first extracted OLE object and the second extracted OLE object and between the first data and the second data.

16. The system of claim 15, wherein the comparison output document includes data used to display discrete differences in a color format, an underline format, a bold format, or an italics format.

17. The system of claim 13, wherein the comparison output document includes data reflecting a difference between the first extracted OLE object and the second extracted OLE object.

18. The system of claim 13, wherein the first extracted OLE object is of a type compatible with an application that created the first OLE object.

19. A system of comparing documents comprising:
a processor; and
a memory including instructions that, when executed by the processor, cause the processor to perform the operations of:
receiving information associated with a first document including first data, a first OLE object embedded in the first document, and a second OLE object embedded in the first document;
receiving information associated with a second document including second data, a third OLE object embedded in the second document, and a fourth OLE object embedded in the second document;
receiving a request to ignore the first OLE object,
comparing, based on the request, using intermediate files, the first data with the second data to generate a primary comparison output document and the second OLE object with the fourth OLE object to generate an object comparison output document, and
generating a comparison output document by inserting the object comparison output document including a result of the comparing of the second OLE object with the fourth OLE object into the primary comparison output document including a result of the comparing of the first data with the second data.

20. The system of claim 19, wherein the request includes a request from a user to exclude the first OLE object from comparison operations.

21. The system of claim 19, wherein the request includes an instruction to exclude from comparison operations OLE objects with a document type of the first OLE object.

22. A method of comparing documents, performed by a processor, comprising:
receiving information associated with a first document including first data and a first OLE object embedded in the first document;
receiving information associated with a second document including second data and a second OLE object embedded in the second document;
comparing the first data with the second data to detect any differences between the first data and the second data and generate a primary comparison output document;
comparing the first OLE object with the second OLE object to detect any differences between the first OLE object and the second OLE object and generate an object comparison output document; and
generating a comparison output document by inserting the object comparison document including a result of the comparing of the first OLE object with the second OLE object into the primary comparison output document including a result of the comparing of the first data with the second data, wherein the comparison output document reflects detected differences between the first data and the second data and the first OLE object and the second OLE object.

23. The method of claim 22, further comprising:
providing information based on the comparison output document for displaying differences between at least one of the first data and the second data and differences between the OLE object and the second OLE object.

24. A system for comparing compound documents, wherein a compound document comprises a primary document and an OLE object, the system comprising:
a processor; and
a memory including instructions that, when executed by the processor, cause the processor to perform the operations of:
extracting a first OLE object from a first compound document to a first object comparison file and a second OLE object from a second compound document to a second object comparison file,
comparing a first primary document of the first compound document and a second primary document of the second compound document to generate a primary comparison output document;
comparing the first object comparison file and the second object comparison file to generate an object comparison output document; and
generating a comparison output document by inserting the object comparison output document including a result of the comparison of the first object comparison file and the second object comparison file into the primary comparison output document including a result of the comparison of the first primary document and the second primary document.

25. The system of claim 24, wherein the operation of extracting further includes marking a location of the first OLE object in the first compound document.

26. The system of claim 25, wherein the location of the first OLE object is marked by storing the location in a database file.

27. The system of claim 24, wherein the first primary document is one of a word processing document, a spreadsheet document, a PDF document, a flowchart document, a computer aided design document, an image document, and a presentation document.

28. The system of claim 24, wherein the processor further performs the operations of:
   determining an OLE object location from one of the first compound document or the second compound document; and
   inserting the object comparison output into the primary comparison output document based on the OLE object location.

29. The system of claim 24, wherein the result of the object comparison includes data reflecting a difference between the first OLE object and the second OLE object.

30. The system of claim 24, wherein the first object comparison file is of a type compatible with an application that created the first OLE object.

31. The system of claim 24, wherein the operation of extracting further comprises the operation of converting the first OLE object to the first object comparison file, such that a file type of the first object comparison file is different from a file type of the first OLE object.

* * * * *

UNITED STATES PATENT AND TRADEMARK OFFICE
CERTIFICATE OF CORRECTION

PATENT NO.       : 8,527,864 B2
APPLICATION NO.  : 12/861000
DATED            : September 3, 2013
INVENTOR(S)      : Deepak Massand It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 130 days.

Signed and Sealed this

Twenty-third Day of May, 2017

Michelle K. Lee
*Director of the United States Patent and Trademark Office*